(12) United States Patent
Irby et al.

(10) Patent No.: US 7,018,156 B2
(45) Date of Patent: Mar. 28, 2006

(54) WHEEL RECONDITIONING STATION AND METHOD OF USE

(75) Inventors: Patrick A. Irby, Huntington Beach, CA (US); Jason R. Irby, Huntington Beach, CA (US)

(73) Assignee: United Wheel Techs, Inc., Huntington Beach, CA (US)

( * ) Notice: Subject to any disclaimer, the term of this patent is extended or adjusted under 35 U.S.C. 154(b) by 0 days.

(21) Appl. No.: 10/794,114

(22) Filed: Mar. 5, 2004

(65) Prior Publication Data
US 2005/0040698 A1 Feb. 24, 2005

Related U.S. Application Data (60) Provisional application No. 60/496,275, filed on Aug. 19, 2003.

(51) Int. Cl.
*B65G 7/00* (2006.01)

(52) U.S. Cl. ............... 414/427; 414/426; 15/53.4; 104/26.1

(58) Field of Classification Search ............... 104/26.1, 104/26.2, 32.1; 29/402.06, 402.18, 402.19, 29/527.4, 894.35; 15/53.4; 73/117, 127; 414/433, 426, 427, 911; 280/47.26, 472.7
See application file for complete search history.

(56) References Cited

U.S. PATENT DOCUMENTS

| | | | | |
|---|---|---|---|---|
| 2,975,447 A | * | 3/1961 | Vuchinas | ............... 15/53.4 |
| 3,843,000 A | | 10/1974 | Bennett | |
| 4,009,449 A | | 2/1977 | Agans | |
| 4,009,499 A | | 3/1977 | Casler et al. | |
| 4,460,306 A | * | 7/1984 | Hawkins | ............... 414/427 |
| 4,532,665 A | | 8/1985 | Evans et al. | |
| 4,571,142 A | * | 2/1986 | Niewald et al. | ............ 414/427 |
| 5,161,281 A | | 11/1992 | Hanen | |
| 5,197,191 A | | 3/1993 | Dunkman et al. | |
| 5,253,927 A | * | 10/1993 | Erickson | ............... 300/2 |
| 5,499,524 A | | 3/1996 | Len | |
| 5,513,938 A | | 5/1996 | Chambers | |
| 6,095,745 A | * | 8/2000 | Garnett | ............... 414/427 |
| 6,217,424 B1 | | 4/2001 | Stephens | |
| 6,347,444 B1 | * | 2/2002 | Pittman | ............... 29/402.06 |
| 6,367,303 B1 | | 4/2002 | Hizono | |
| 6,671,917 B1 | * | 1/2004 | Nishina | ............... 15/53.4 |

* cited by examiner

*Primary Examiner*—Frantz F. Jules
(74) *Attorney, Agent, or Firm*—Fulwider Patton LLP (57) ABSTRACT

The present invention provides a compact and portable reconditioning station that avails all of the tools and materials that a technician needs for reconditioning a wheel. Additionally, the station enables the technician to rotate and index the wheel by depression of a footpedal to leave his hands free to manipulate the various tools that are used during the reconditioning process. The reconditioning station is easily transportable in its compact stowed configuration and is quickly deployable at the jobsite.

19 Claims, 5 Drawing Sheets

WHEEL RECONDITIONING STATION AND METHOD OF USE

CROSS REFERENCE TO RELATED APPLICATION

This is a non-provisional application claiming priority to provisional application No. 60/496,275, entitled Wheel Indexing and Rotating Apparatus, filed on Aug. 19, 2003, which is hereby incorporated by reference in its entirety.

BACKGROUND OF THE INVENTION

The present invention generally relates to the reconditioning or custom painting of an automotive road wheel while the wheel remains attached to an automobile and while the wheel has a tire mounted thereon. More particularly, the invention pertains to a compact and portable workstation that enhances a technician's ability to recondition such wheel as well as to methods for reconditioning the wheel using such workstation.

Automotive road wheels are easily damaged such as for example by contact with a curb during parking maneuvers, incompatibility with automatic carwash equipment or by the careless mounting or dismounting of a tire. While the damage that results is usually not structural it is nonetheless unsightly and detracts from the overall appearance and potentially the value of the vehicle. A demand therefore exists for the ability to relatively quickly and easily repair such damage. Obviating the need to dismount the wheel from the vehicle, let alone the tire from the wheel, substantially reduces the amount of time and labor involved.

The reconditioning of a damaged wheel typically requires the damaged area to be ground down, blended into the adjacent areas and then refinished which may require the polishing or painting of the wheel. Paining in turn may in turn require the sequential application of any of various materials such as for example primers, adhesion promoters, color coats and possibly clear coats. The various tools that must be brought to bear against the wheel to perform such operations often require a certain orientation between tool and wheel so as to optimize the desired effect and it is typically more efficient and effective to bring the wheel into position relative to the tool rather than vice versa.

Additionally, since repair technicians tend to travel to various jobsites rather than to operate out of a fixed repair facility, it is most desirable for the various tools and equipment that are needed to be assembled in a compact and easily transportable form that allows for quick and easy set up as well as restowing. Additionally, it is most desirable for all of the tools and materials that are needed to be arrayed in an organized, readily accessible fashion so as to enable the technician to effect the repair as quickly and easily as possible.

A need therefore exists for a reconditioning station that can simultaneously serve all of these needs. Such station should readily avail all of the tools and materials that may be needed by a technician to grind, polish, clean and refinish a damaged section of a wheel. Moreover, the station should facilitate the reconditioning of a wheel while such wheel remains attached to a vehicle and while a tire remains mounted thereto by enabling a technician to control the rotational orientation of the wheel while leaving the technician's hands free to manipulate any of the various tools that are used in the reconditioning process. Finally, the reconditioning station should be compact so as to be readily portable yet quickly deployable upon arrival at a jobsite.

INVENTION SUMMARY

The reconditioning station of the present invention comprises a compact and portable device that is quickly and easily deployable to engage a tire surface and rotate the wheel and tire combination while additionally providing ready access to all of the various tools and materials that are needed by a technician to effect a wheel repair. The station includes an articulating arm that renders the station compact while in its stowed configuration yet capable of engaging a wide variety of vehicle wheels including wheels mounted to low slung automobiles with limited access. The method of the present invention comprises the efficient use of such station to effect a wheel repair.

The reconditioning station of the present invention includes a chassis which includes input ports for receiving electrical power as well as a flow of compressed air, compressed air output ports for supplying compressed air at different pressures, a drive motor, and storage compartments configured to maintain the various tools and materials that are needed during the reconditioning process in an organized and readily accessible fashion. The station includes an articulating arm that unfolds from the station so as to cause a drive roller to engage the surface of tire mounted to a wheel and wherein such articulating arm transfers rotation from the drive motor to the roller. A footpedal, with which the operation of the motor and hence the rotation of the wheel is controlled, is stored within the work station and is readily extendible therefrom when needed. The footpedal may also be relied upon to control the speed of rotation wherein speed is a direct function of the depth to which the pedal is depressed.

The articulating arm has a proximal member and a distal member. The drive roller extends laterally from the distal end of the distal member and includes an anchoring cradle which engages the ground upon deployment of the arm so as to support the drive roller under the weight of the wheel and tire combination placed thereon as well as prevent the roller and hence the arm and reconditioning station from shifting as torque is applied to the wheel by the drive roller. The cradle additionally serves the function of locking the arm in its folded position during transport of the reconditioning station. The reach and lateral offset of the arm allows a powerful drive motor to be used without compromising the ability of the device to engage a wheel and tire combination mounted to a vehicle with limited accessibility.

The various tools that are needed during the reconditioning process may include a pneumatic grinder, abrader, polisher or other metal working power tool wherein such tools require a fairly high pressure as well as an airbrush for use during the painting steps which requires an air supply at a substantially lower pressure. Separate pneumatic output ports within the station obviate the need for disconnecting and reconnecting different tools during the reconditioning process and for readjusting a pressure regulator to accommodate the different pressure requirements.

The method of the present invention requires the transportation of the workstation to the jobsite, hookup to a remote source of electrical power and compressed air and the unfolding of the articulating arm. The corner of the vehicle with the wheel in need of repair is jacked up slightly, the drive roller is positioned thereunder and the vehicle is lowered so that the tire exerts a slight pressure on the drive roller. The various pneumatic tools, already connected to their respective sources of compressed air are extracted from their storage compartments and the permanently wired footpedal is retrieved from its storage compartment. As such, the configuration of the workstation requires only a minimal number of interconnections to be made which enables a technician to be ready to commence a repair within a very few minutes after arriving at a jobsite.

By actuating the footpedal, the technician can quickly and easily index a wheel into a desired position to most effectively access a damaged area with a particular power tool or can rotate the wheel while such powertool is being applied to a particular wheel surface to enable the creation of a smooth transition from the repaired area to the rest of the wheel. The ability to rotate and/or index the wheel via handsfree control greatly simplifies and expedites the various grinding, polishing, cleaning, masking and finishing operations. The variable speed control allows the speed of rotation to be tailored to the requirements of a particular reconditioning step. Because the consumables, e.g. the cleaners, adhesion promoters, paints and even rags are maintained by the workstation within easy reach of the technician, the reconditioning process can proceed at a rapid pace. After the repair is complete, the air tools and footpedal are restowed in their respective compartments and the station is disconnected from the air and power sources. A quick jacking of the wheel allows the drive roller and arm to be extracted from thereunder and the arm to be folded into its compact configuration against the station after which the entire station can be lifted into the technician's truck for transport to the next jobsite.

These and other features of the present invention will become apparent from the following detailed description of a preferred embodiment which, taken in conjunction with the accompanying drawings, illustrates by way of example the principles of the invention.

DETAILED DESCRIPTION OF THE PREFERRED EMBODIMENTS

The Figures generally depict a preferred embodiment of the present invention. The device comprises a self-contained wheel reconditioning station that not only enables a technician to rotate or index the wheel to be reconditioned while leaving the technician's hands free to manipulate any of various handtools that are used during the reconditioning process but additionally arrays all of the tools and materials that are needed in a readily accessible fashion.

Figure 1:
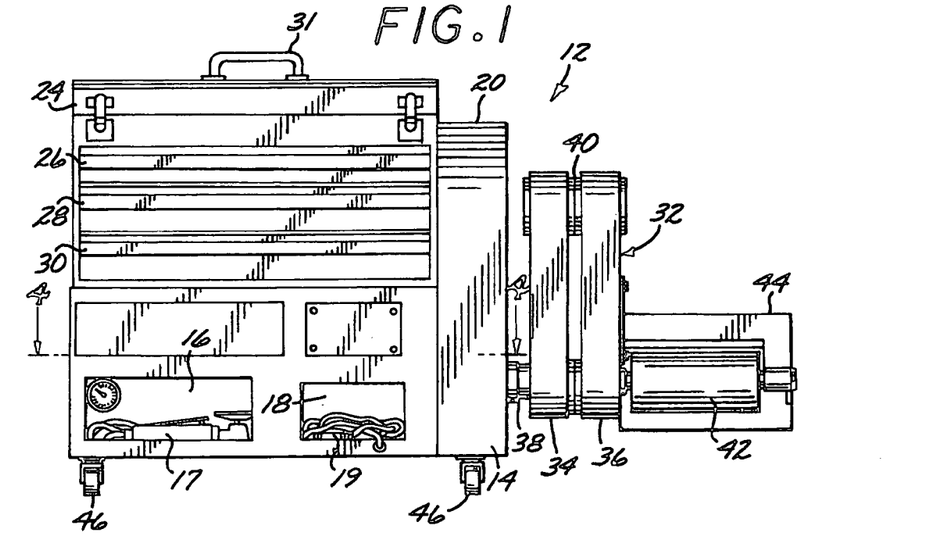
FIG. 1 is front plan view of the reconditioning station of the present invention.

FIG. 1 is a front plan view of the of the reconditioning station 12 of the present invention. The reconditioning station 12 includes a chassis 14 which defines and/or supports a plurality of storage compartments 16, 18, 20, 22, 24, 26, 28 and 30 and includes an articulating arm 32 that is mounted to one side thereof. Storage compartments 24, 26, 28, 30 can be lifted off of the chassis as a unit wherein grasp handle 31 is jilted for such purpose. When in place, the storage compartments appear integral with the chassis. A rotary grinder 17 and an airbrush (not shown) and associated air hoses may for example be stored in compartment 16 while a footpedal 19 and associated power cord may be stored in compartment 18. The articulating arm includes a proximal member 34 and a distal member 36. In the preferred embodiment the members 34 and 36 are of identical construction with plates on the opposite sides also being identical for economy of manufacture of inventory. The proximal arm is rotatably mounted to the chassis at 38 while the distal arm is rotatably connected to the proximal arm at 40. A drive roller 42 extends laterally from the distal end of the distal arm 36 and includes a cradle 44 configured to support the roller. The entire work station is supported by a set of casters 46 that are arranged in a triangular pattern.

Figure 2:
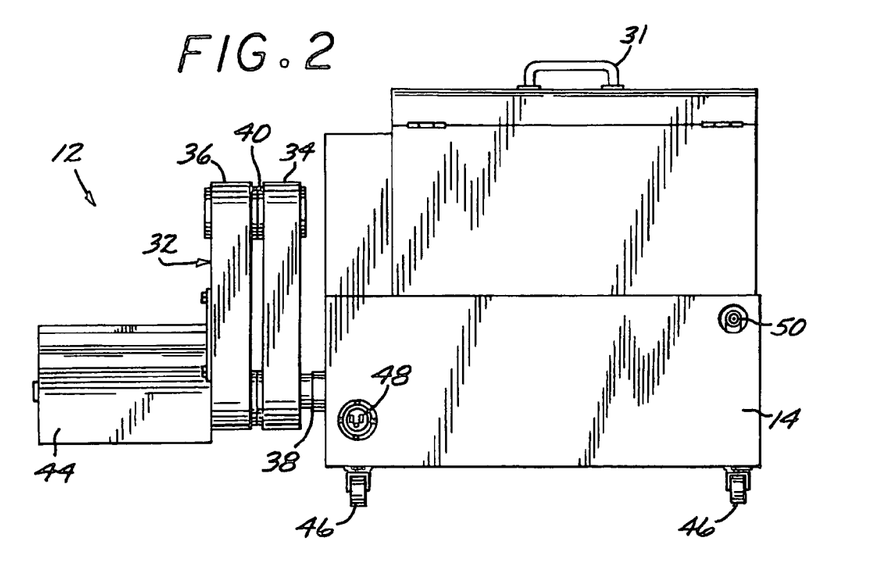
FIG. 2 is a back plan view of the station shown in FIG. 1.

The back plan view of FIG. 2 additionally shows an electrical plug 48 and a pneumatic quick connect coupling 50 to which the work station is hooked up for deployment. Electrical power and compressed air may be available at a worksite or, optionally, a gasoline-powered generator and a compressor can be carried in the bed of a pickup truck that the technician drives to the jobsite. Such generator can be relied upon to supply the electrical power to the workstation as well as to the compressor which in turn supplies compressed air to the workstation.

Figure 3:
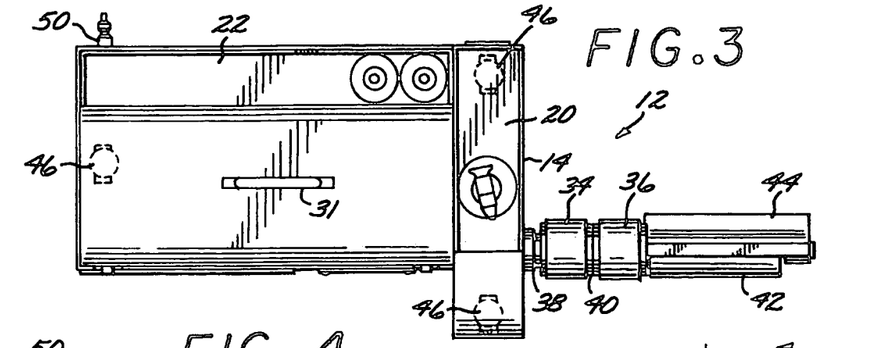
FIG. 3 is a top plan view of the station shown in FIG. 1.

The top plan view of FIG. 3 provides a view of storage compartments 20 and 22 which may be use to stow various bottles and containers of materials used during the reconditioning process. The triangular arrangement of the casters 46, visible in phantom, imparts stability to the device when traversing and when deployed on uneven ground.

Figures 4, 5:
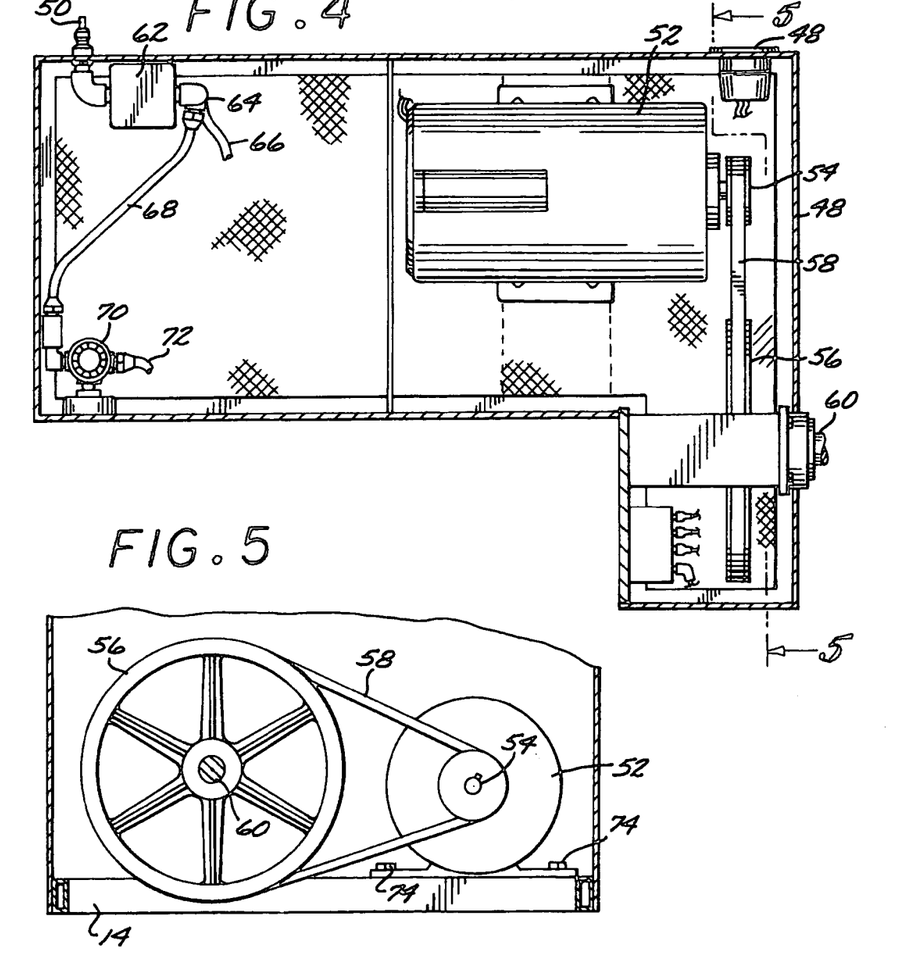
FIG. 4 is a slightly enlarged, cross-sectional view taken along lines 4—4 of FIG. 1.
FIG. 5 is a cross-sectional view taken along lines 5—5 of FIG. 4.

FIG. 4 is a somewhat enlarged, cross-sectional view taken along the lines 4—4 of FIG. 1 showing some of the components accommodated within the chassis 14. Electric drive motor 52 is attached to the base of the chassis. Rotation is transferred from pulley 54 to pulley 56 via drive belt 58 while output shaft 60 transfers rotation to the a pulley system that is arranged within articulating arm 32. The pneumatic coupling 50 is plumbed through a water separator 62 to a bifurcation 64 wherein one branch 66 is available for use by a rotary power tool at an unreduced pressure and a second branch 68 is connected to a pressure regulator 70 to provide for a substantial reduction in pressure. The reduced pressure output 72 is available for use by an airbrush.

FIG. 5 is a cross-sectional view taken along lines 5—5 of FIG. 4 to show the drive motor 52 positively attached to the base of chassis 14 at 74 and the pulley arrangement 54, 56 which serves to reduce rotational speed and increase torque.

Figures 6, 7:
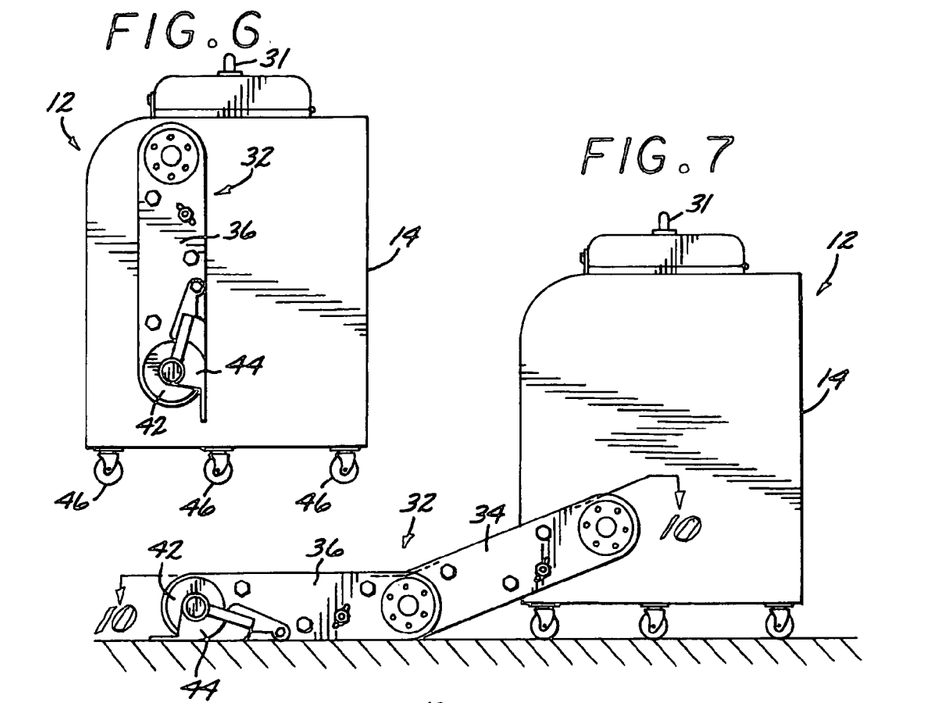
FIG. 6 is a side plan view of the station shown in FIG. 1.
FIG. 7 is a side plan view of the station shown in FIG. 6 with its articulating arm in its deployed position.

FIGS. 6 and 7 respectively, show the articulating arm 32 in its stowed and deployed positions. In its stowed state the articulating arm is confined to a profile within that of the chassis 14. In its deployed state the articulating arm unfolds to reach under the vehicle and orient the drive roller 42 for contact with the tire of a raised wheel. In such position, the distal member 36 extends parallel to the ground while the cradle 44 contacts the ground to provide support for the drive roller. Such configuration completely isolates the chassis 14 from any weight load exerted by a wheel and tire combo on the drive roller and serves to transfer all such loads directly to the ground. Additionally, the cradle prevents the shifting of the arm and hence chassis once torque is applied by the drive roller to the tire.

Figure 8:
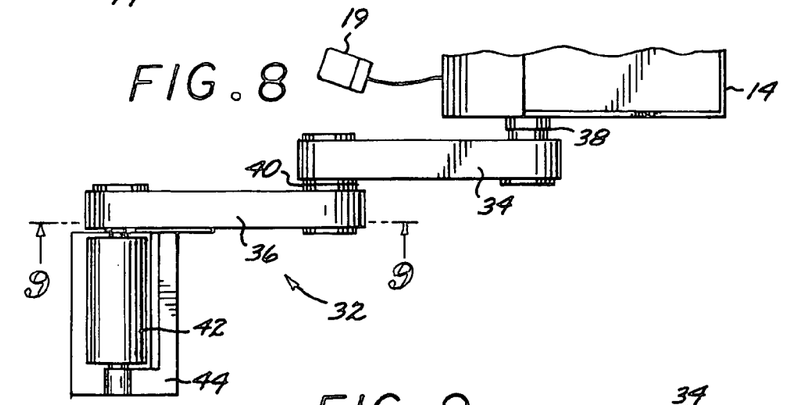
FIG. 8 is a top plan view of the articulating arm in its deployed position.

FIG. 8 additionally shows the lateral offset of the drive roller 42 relative to the chassis 14. Such offset enhances accessibility as the chassis will be less likely to make contact with the vehicle as it is maneuvered into place and as the vehicle's tire is lowered onto the drive roller. The lateral offset additionally serves to eliminate any constraint that would otherwise be imposed on the size and hence power of the drive motor. A large and powerful motor can therefore be used to enable a wheel and tire combination to be spun up to a higher speed more quickly. Also shown is the footpedal 19 that has been removed from its storage compartment 18. The footpedal is preferably configured to provide variable speed control whereby speed is a direct function of the depth to which the pedal is depressed.

Figure 9:
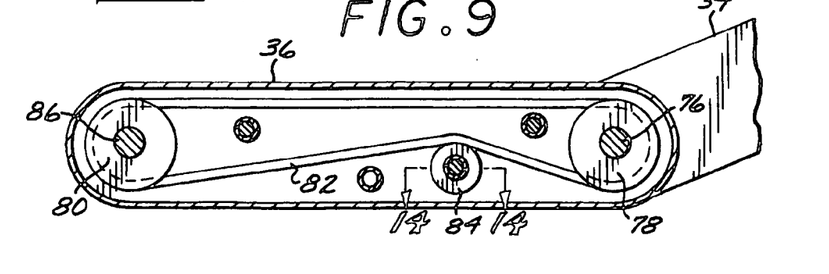
FIG. 9 is a slightly enlarged, cross-sectional view taken along lines 9—9 of FIG. 8.

FIG. 9 is an enlarged cross-sectional view of the distal member 36 taken along lines 9—9 of FIG. 8. Rotation is transferred from the proximal member 34 of articulating arm 32 by shaft 76 which is coupled to pulley 78. Rotation is in turn transferred to pulley 80 by drive belt 82 that is held in tension by tensioner 84.

Figures 10, 11, 12:
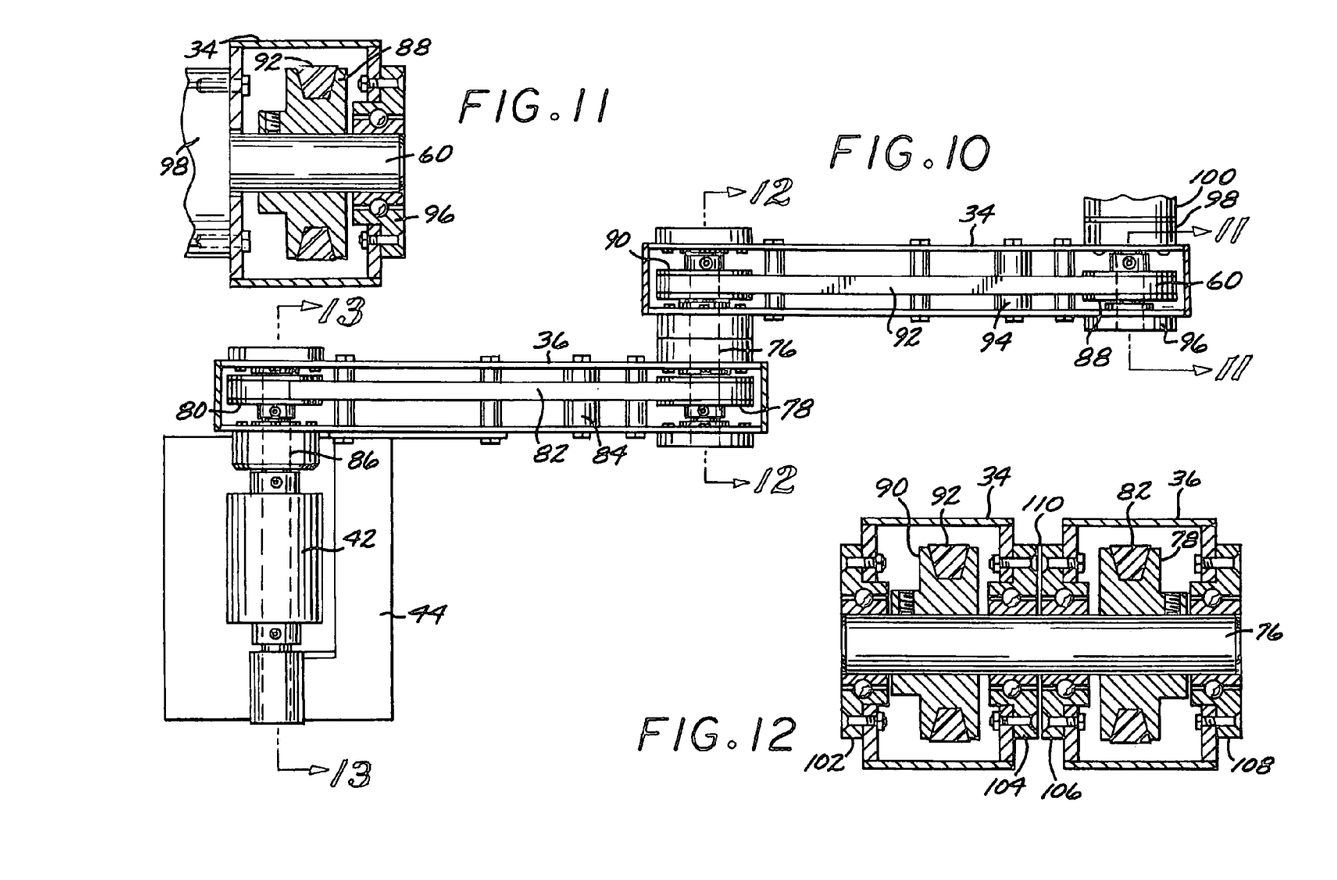
FIG. 10 is an enlarged cross-sectional view taken along lines 10—10 of FIG. 7.
FIG. 11 is a further enlarged, cross-sectional view taken along lines 11—11 of FIG. 10.
FIG. 12 is a further enlarged, cross-sectional view taken along lines 12—12 of FIG. 10.

FIG. 10 is a cross-sectional view taken along the lines 10—10 of FIG. 7 showing the internal structure of the articulating arm in its deployed position. Drive shaft 60 extends into the proximal end of proximal member 34 of articulating arm 32 to drive pulley 88. Rotation is transferred from pulley 88 to pulley 90 via drive belt 92 which is tensioned by tensioner 94. Pulley 90 is rotationally locked to transfer shaft 76 which in turn is rotationally locked to pulley 78 in distal member 36.

As is visible in the enlarged cross-sectional view of FIG. 11, output shaft 60 is supported by a bearing set 96 at its distal end. A bronze thrust bearing 98 is attached to the proximal member 34 so as to cooperate with complementary thrust bearing 100 that is affixed to the chassis 14.

The cross-sectional view of FIG. 12 illustrates the manner in which transfer shaft 76 is supported by four bearing sets 100, 102, 104 and 106. A bronze thrust washer 110 situated between the carrier housings for adjacent bearing sets 104 and 106 bears the lateral loads.

Figure 13:
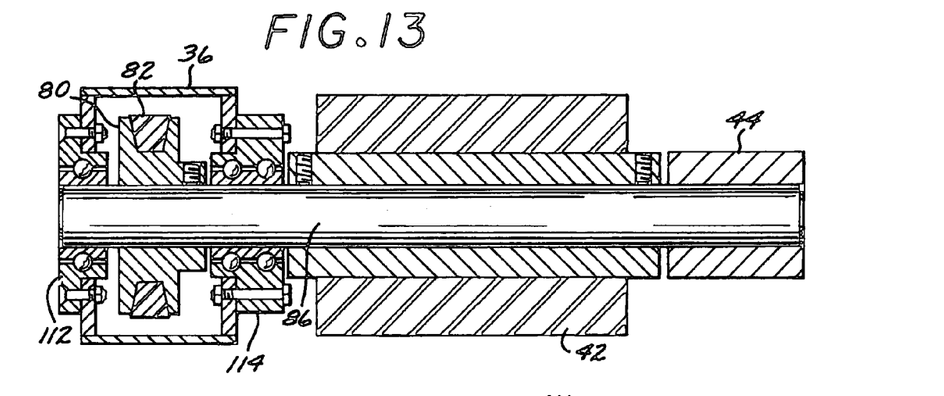
FIG. 13 is a further enlarged, cross-sectional view taken along lines 13—13 of FIG. 10.

In the cross-sectional view of FIG. 13, the internal support for drive shaft 76 and drive roller 42 is visible. Bearing sets 112 and 114 support the drive shaft at its proximal end while its distal end is carried by a sleeve formed within cradle 44.

Figures 14, 15:
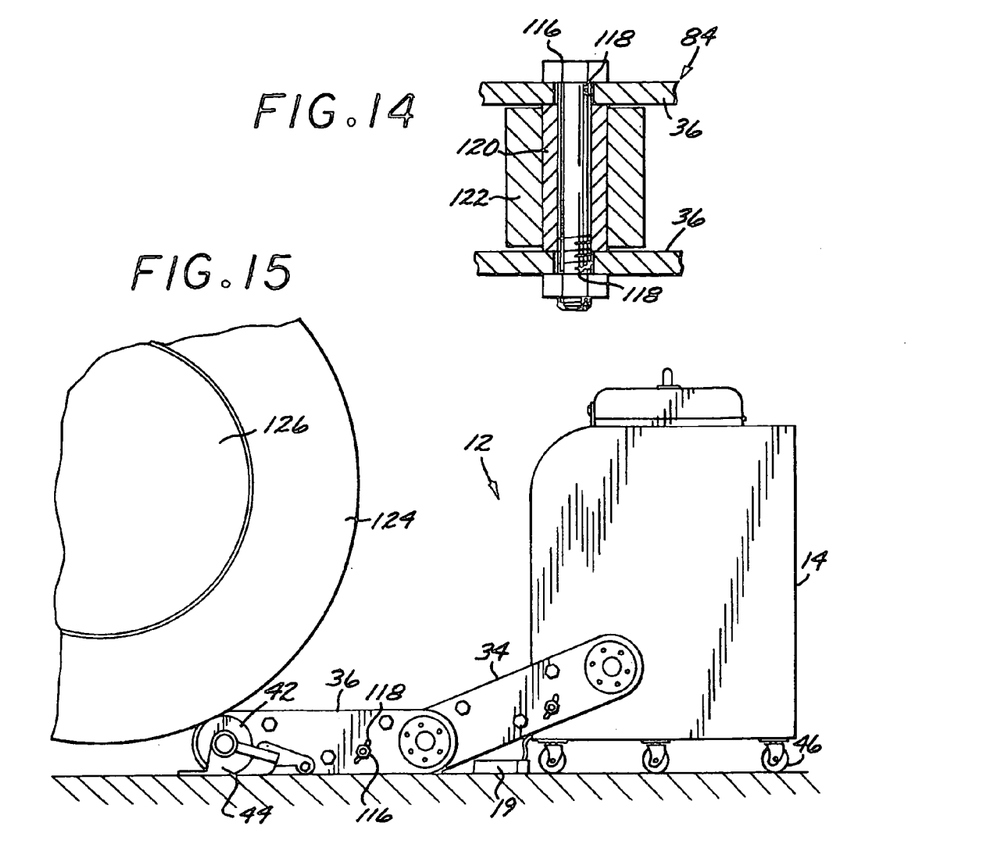
FIG. 14 is an enlarged, cross-sectional view taken along lines 14—14 of FIG. 9.
FIG. 15 is a side view of the workstation as shown in FIG. 7 engaging a tire mounted to a wheel.

A cross-sectional view of tensioner 84 is shown in FIG. 14. A bolt 116 extends between the walls of distal member 36 and is received within slots 118 that are formed in such walls. The bolt carries a plain bearing 120 which in turn supports a rotatable idler roller 122. By loosening and shifting the bolt within the slots, the tension of the belt can be adjusted. The identical arrangement is used for the tensioner 94 in the proximal member 34.

FIG. 15 shows the reconditioning station 12 of the present invention in its deployed state and in engagement with a tire 124 that is mounted to a wheel 126 which in turn is mounted to a vehicle. In use, the reconditioning station of the present invention is first transported to a job site in its compact stowed form. The compactness and portability of the device easily allows it to be lifted off of for example a pickup truck bed and rolled into position near a vehicle with a wheel in need of repair. The ability to separate storage compartments 24, 26, 28, 30 from the chassis serves to divide the weight that needs to be lifted. The corner of the vehicle with the damaged wheel is jacked up off the ground. The articulating arm 32 is extended and the station is rolled into place so as to position the drive roller 42 beneath the tire after which a portion of the vehicle weight is lowered onto the drive roller. A compressed air source is attached to the reconditioning station as is a power cord. The technician then pulls the footpedal 19 as well as the power tools 17 out of their respective compartments and is ready to recondition the wheel.

Actuation of the drive roller by depression of the footpedal allows the technician to use both hands to manipulate any of the various tools that are required to recondition the wheel including for example a rotary grinder, polishing pad, or other metal working tools. The desired effect may require the indexing of the wheel into a particular position to allow the tool to most advantageously engage the wheel surface. Alternatively, it may be advantageous to rotate the wheel while the tool engages a particular surface. Additionally, rotation and indexing of the wheel is advantageous in any of the other various reconditioning operations that are involved including for example cleaning and preparing the various surfaces, masking various surfaces and machining and then finishing such surfaces.

The ability to vary speed with the footpedal allows the rotational speed of the wheel to be tailored to a particular reconditioning step. A slow rotational speed of about 2 rpm has been found to be useful for inspection and rough grinding. A slightly higher speed of about 5 rpm is useful for smoothly blending the damaged area into the undamaged areas of the wheel while a rotational speed of about 20 rpm is ideal for the smooth application of the various paints and materials used in the finishing operation. A slow rotational speed of about 2 rpm has also been found to be ideally suited for the polishing operation should one be required. At such speed, the wheel surface is advanced past the buffing pad at a rate of little over 1 inch per second. This causes heat to be generated between the buffing pad and the wheel surface which is required for achieving a high quality polished finish. Maintaining a slow and steady rate of the wheel surface of the buffer ensures the generation of steady and even heating to yield the desired mirror-like, uniform finish.

As will be appreciated by those skilled in the art the drive roller speed may be controlled by, for instance, a selector switch on the control panel coupled with a potentiometer driven by the footpedal or manually by switching the control panel switch to a control panel potentiometer. In a preferred embodiment, the drive built is configured to rotate the drive roller at a selected speed and the footpedal acts as an on/off switch only.

Indexing is also easily accomplished by simply releasing the footpedal when the wheel is rotated into the desired position. The accessibility of the various tools and materials that are needed and the hands-free ability to rotate and index the wheel allows the technician to remain seated during the entire reconditioning process. After the repair is complete the corner of the car is again jacked up to relieve pressure on the drive roller to allow the drive roller to be extracted from under the wheel. The articulating arm is folded and stowed in place rendering the reconditioning station readily portable.

While a particular form of the invention has been described and illustrated, it will also be apparent to those skilled in the art that various modifications can be made without departing from the spirit and scope of the invention. Accordingly, it is not intended that the invention be limited except by the appended claims.

What is claimed is:

1. A device for facilitating the reconditioning of an automotive road wheel while such road wheel remains attached to an automobile and has a tire mounted thereon, comprising:
   a portable chassis configured for storing all tools and materials needed for reconditioning the road wheel;
   a drive mechanism for generating rotation, supported by said chassis;
   an articulating arm attached to said chassis, configured to unfold from a compact configuration adjacent to said chassis to a deployed configuration extending away from said chassis, and operable to transfer rotation from said drive mechanism to its distal end; and
   a drive roller, rotatably secured to the distal end of said articulating arm, rotationally driven thereby and configured to engage and rotate the tire mounted to the wheel.

2. The device of claim 1, wherein said drive mechanism comprises an electric motor.

3. The device of claim 2, wherein said footpedal controls the rotational speed of said drive mechanism.

4. The device of claim 1, further comprising a footpedal for controlling said drive mechanism.

5. The device of claim 1, wherein said articulating arm comprises a proximal member rotatably attached at its proximal end to said chassis and a distal member rotatably attached at its proximal end to the distal end of said proximal member, wherein said drive roller is rotatably attached to the distal end of said distal member.

6. The device of claim 5, wherein rotation is transferred from said drive mechanism to the drive roller by pulleys and drive belts disposed within said articulating arm.

7. The device of claim 5, further comprising a cradle extending from said distal member, configured for transferring load exerted by a tire on said drive roller to the ground so as to support said drive roller and anchor said device.

8. The device of claim 1, wherein said chassis is supported by casters.

9. The device of claim 8, wherein said casters are arranged in a triangular pattern.

10. The device of claim 1, wherein said chassis provides compressed air at two different pressures.

11. A device for reconditioning an automotive road wheel mounted to a wheeled vehicle with a tire mounted thereon and comprising:
    a portable chassis mounted on wheels and configured with compartments for storing wheel working tools;
    a motor mounted in said chassis;
    a pivotable arm carried on one end from the chassis and rotateable between a retracted position and a deployed position with a free distal end thereof supported on a support surface under the tire of said wheel to be reconditioned;
    a drive roller mounted to said distal end and drivingly connected with said drive mechanism; and
    a control device coupled with the drive mechanism, and operable to change the speed of the drive roller between first, second and third speeds of rotation whereby the wheel may be elevated from said support surface, the chassis maneuvered about on said casters and an arm rotated to said deployed position to engage said drive roller with said tire and the control system manipulated to change speeds of rotation of said roller to selected ones of said first, second and third speeds while a workman reconditions said wheel.

12. A device for reconditioning an automotive road wheel while on an automobile and mounting a tire and comprising:
    a portable chassis configured with a plurality of compartments for receiving reconditioning tools to recondition said road wheel;
    casters under said chassis;
    an electric motor by said chassis;
    an articulating arm including substantially identical proximal and distal members, the proximal end of the proximal member being pivotally connected to said chassis and the distal member terminating in a free distal end;
    drive belts mounted in the respective arms to drivingly couple said motor with said drive roller;
    a control device connected with said drive motor and including a footpedal depressible to control the rotation of said drive system and said drive roller at different selected speeds.

13. The device of claim 12 wherein said proximal and distal members include identical side plates spaced laterally apart to form cavities therebetween and wherein said drive belts are received in said cavities.

14. A method for reconditioning an automotive road wheel, said road wheel having a tire mounted thereon and said road wheel being mounted to a vehicle, comprising:
    providing a reconditioning station configured for storing all tools and materials needed for reconditioning the road wheel and including a drive roller for engaging and rotating the tire mounted to the road wheel in response to depression of a footpedal;
    raising a corner of an automobile having the wheel in need of reconditioning mounted thereto;
    engaging said tire with said drive roller; and
    applying reconditioning tools to the surface of said wheel while controlling the position and rotation of said wheel while leaving both hands free to manipulate said reconditioning tools.

15. The method of claim 14, wherein said position and rotation of said wheel is controlled by a footpedal.

16. The method of claim 15, wherein rotational speed of said wheel is controlled by said footpedal.

17. The method of claim 14, wherein said tools are powered from said reconditioning station.

18. The method of claim 17, wherein said tools are powered by compressed air.

19. A method of reconditioning an automotive road wheel mounted on a vehicle, said road wheel having a tire mounted to comprising:
    providing a reconditioning station configured with a plurality of compartments storing reconditioning tools and including an articulated arm disposed laterally of a chassis, to be deployed under the body of the vehicle, mounting a drive roller, and lowerable to a support surface under said body to support said roller elevated to drivingly engage said tire;
    raising said vehicle to raise said tire off said support surface to engage said drive roller and drive said wheel at a selected speed of rotation;
    depressing a footpedal to control the speed of said drive roller at a selected speed while withdrawing selected ones of said reconditioning tools from said compartments to apply said reconditioning tools selectively to said wheel.

* * * * *

UNITED STATES PATENT AND TRADEMARK OFFICE
CERTIFICATE OF CORRECTION

| | | |
|---|---|---|
| PATENT NO. | : 7,018,156 B2 | Page 1 of 1 |
| APPLICATION NO. | : 10/794114 | |
| DATED | : March 28, 2006 | |
| INVENTOR(S) | : Patrick A. Irby and Jason R. Irby | |

It is certified that error appears in the above-identified patent and that said Letters Patent is hereby corrected as shown below:

Col. 8, line 50
replace "to"
with --thereto--

Signed and Sealed this

Eighth Day of August, 2006

JON W. DUDAS
*Director of the United States Patent and Trademark Office*